(12) United States Patent
Carlsen et al.

(10) Patent No.: US 6,192,265 B1
(45) Date of Patent: Feb. 20, 2001

(54) DIAGNOSTIC IMAGE PROCESSING METHOD

(75) Inventors: Ingwer Carlsen, Kiel (DE); Johannes J. Van Vaals, Eindhoven (NL); Volker Rasche, Hamburg; Michael Grass, Ellerbek, both of (DE)

(73) Assignee: U.S. Philips Corporation, New York, NY (US)

( * ) Notice: Under 35 U.S.C. 154(b), the term of this patent shall be extended for 0 days.

(21) Appl. No.: 09/039,351

(22) Filed: Mar. 13, 1998

(30) Foreign Application Priority Data

Mar. 13, 1997 (DE) .................................................. 19710339
Apr. 4, 1997 (DE) .................................................. 19713846

(51) Int. Cl.⁷ .................................................. A61B 5/05
(52) U.S. Cl. .................................................. 600/425; 324/309
(58) Field of Search .................................................. 600/410, 425; 382/128; 324/307, 309

(56) References Cited

U.S. PATENT DOCUMENTS

| | | | |
|---|---|---|---|
| 4,858,128 | 8/1989 | Nowak | 364/413.13 |
| 5,243,284 | * 9/1993 | Noll | 324/309 |
| 5,671,263 | 9/1997 | Ching-Ming | 378/8 |
| 5,946,425 | * 8/1999 | Bove et al. | 382/294 |

OTHER PUBLICATIONS

Aria Nosratinia, Nader Mohsenian, Michael T. Orchard, Bede Liu "Interframe coding of magnetic resonance images", IEEE Transactions on medical imaging, vol. 15, No. 5, Oct. 1996, pp. 639–647.

Tor Arne Reinen "Noise Reduction in heart movies by motion compensated filtering " SPIE vol. 1606 visual communications and image processing '91: Image processing, pp. 755–763.

* cited by examiner

Primary Examiner—Marvin M. Lateef
Assistant Examiner—Eleni Mantis Mercader
(74) Attorney, Agent, or Firm—John F. Vodopia

(57) ABSTRACT

The invention relates to an image processing method for improving the signal-to-noise ratio for a series of MR images or CT images which are based on the projection-reconstruction method. First the pixels which reproduce the same sub-structure in the projection images are determined in the one-dimensional projection images constituting the two-dimensional MR or CT images. The image values of these pixels are subjected to noise filtering. Two-dimensional MR images or CT images are reconstructed from the noise filtered one-dimensional projection images.

10 Claims, 6 Drawing Sheets

DIAGNOSTIC IMAGE PROCESSING METHOD

BACKGROUND OF THE INVENTION

1. Field of the Invention

The invention relates to a diagnostic image processing method in which a series of two-dimensional images is formed of an object present in an examination zone, each image of the series being derived from a number of one-dimensional projection images which are formed by projection of the object from one of a plurality of predetermined projection directions and which consist of pixels.

In the MR (magnetic resonance) technique methods of this kind are known in conjunction with the so-called projection-reconstruction method. Such methods are also used in X-ray computer tomography.

2. Description of Related Art

For medical diagnosis it is often necessary to form a series of images of one and the same object, said series representing the object in, for example different phases of motion. The quality of the individual images is then usually limited by noise. In the case of MR methods this noise occurs if the MR signals required for the reconstruction of the images are acquired in an as short as possible period of time. In the case of X-ray CT methods noise occurs whenever only a small dose is used per individual image so as to keep the radiation dose for the patient small.

An article by T.A. Reinen in Proc. SPIE, Vol. 1606, pp. 755–763, 1991, discloses a method which reduces the noise in such a series of images by determining a motion vector field, by applying a noise reduction filter to the pixels (pixel=picture element) linked by the motion vector field, and by taking up the image values resulting from the filtering operation in an output image. This method is based on the consideration that even though the individual images of the series deviate from one another because at least some details are situated in different positions within the images, these details are usually reproduced with the same brightness in the various images. This makes it possible to link two images of the series by way of a motion vector field which describes the shift of these details from one image to another and hence links the content-wise associated pixels (i.e. pixels reproducing the same point of a structure in the various images). The known noise reduction method could also be applied to series of images formed by means of the above-mentioned methods.

It is a drawback of this method, however, that it is comparatively time consuming because for each pixel in an image in prince the content-wise associated pixel within a two-dimensional image window in the other image must be searched. Citation of a reference herein, or throughout this specification, is not to construed as an admission that such reference is prior art to the Applicant's invention of the invention subsequently claimed.

SUMMARY OF THE INVENTION

Therefore, it is an object of the present invention to conceive an image processing method of the kind set forth in such a manner that the noise reduction can be performed faster than by means of the known noise reduction method.

This object is achieved according to the invention in that the following steps are carried out:

a) determining a motion vector field which links the content-wise associated pixels in projection images with the same and/or the opposite projection direction, b) applying a noise reduction filter to the image values of the pixels linked by the motion vector field and possibly to their neighboring pixels, c) taking up the image values resulting from the filtering operation in an output projection image, d) reconstructing the images from the associated output projection images.

Thus, according to the invention the noise reduction method is not applied to the individual pixels of a two-dimensional MR or CT image, but to the pixels of a one-dimensional projection image; this offers the advantage that content-wise associated pixels must be searched only within a one-dimensional window. Therefore, this method is faster. The two-dimensional MR image or CT image is derived from a number of one-dimensional projection images which have been noise-filtered in this manner.

One possibility of determining a motion vector field for a projection image includes the following steps: selecting a block (b) of associated pixels in this projection image ($B_i$), determining the position of a block which is present in at least one of the preceding or succeeding projection images ($B_{i-1}$), produced with the same and/or the opposite projection direction, said block having the best correspondence with the block (b) in the one projection image, deriving the motion vector from the position of the block or blocks (b') thus determined, and repeating the previous two steps for other blocks in the projection image ($B_i$). The blocks showing the best similarity can be determined by applying (203) a similarity measure in order to evaluate the correspondence of a block (b) in the one projection image ($B_i$) with a block (b') which is present in different positions in the other projection image ($B_{i-1}$), and determining (204) the position for which the optimum similarity measure is obtained. The determination of the position with the optimum similarity measure as carried out therein can be performed by determining the similarity measure for a starting position of the block (b'), changing (205) the position of the block (b') and determining the similarity measure for the changed position, deriving a new position from the similarity measures for the preceding positions and determining the similarity measure for this position, and iterative repetition of the previous step.

Another possibility of determining a motion vector field is characterized in that it includes the following steps: forming (301, 302) at least one projection image ($B_{1i}$, $B_{2i-1}$), having a reduced spatial resolution and a reduced number of pixels, for each projection image of the series, determining (303) motion vectors which link the content-wise associated pixels in different projection images ($B_{2i}$, $B_{2i-1}$) of the series, and repeating (304) the previous step for the projection images ($B_{1i}$, $B_{1i-1}$) with the next higher spatial resolution using the previously determined motion vectors. The determination of the motion vector field first with a comparatively coarse and subsequently with an increasingly finer resolution, yields fast determination of the motion vector field which is insusceptible to artefacts to a high degree.

A preferred noise filter includes a weighted summing of the image values of the pixels which are content-wise associated with, or are neighbors of this pixel in the other projection images, the weighting factors being greater as the difference between the images value of this pixel and that of one of said pixels is smaller.

A method which is focused on one-dimensional projection images includes the determination, involving a plurality of cycles, of a motion vector for a pixel (j) of a projection image, each cycle including the following steps: selecting different motion vectors (t, s, m), at least one of which can be varied from one cycle to another, evaluating, using a similarity measure ($M_1 \ldots M_4$), the blocks associated with one another by each motion vector (m), selecting the motion vector (m) having the most attractive similarity measure, and repeating the previous three steps during the next cycle. A device suitable for carrying out the method according to the invention includes means for forming a series of images of an object present in an examination zone, each image of the series being derived from a number of projection images which are formed by projection of the object from one of a plurality of predetermined projection directions and which consist of pixels, and a programmable image processing unit (24) for processing the projection images, characterized in that the image processing unit (24) is programmed in such a manner that the following steps are executed: determining (101, 102) a motion vector field which links the content-wise associated pixels in projection images with the same and/or the opposite projection direction, applying (103) a noise reduction filter to the image values of the pixels linked by the motion vector field and possibly to their neighboring pixels, using (103) the image values resulting from the filtering operation to form an output projection image, and reconstructing the images from the associated output projection images.

BRIEF DESCRIPTION OF THE DRAWING

The invention will be described in detail hereinafter with reference to the drawings. Therein.

DETAILED DESCRIPTION OF THE PREFERRED EMBODIMENT

Figure 1:
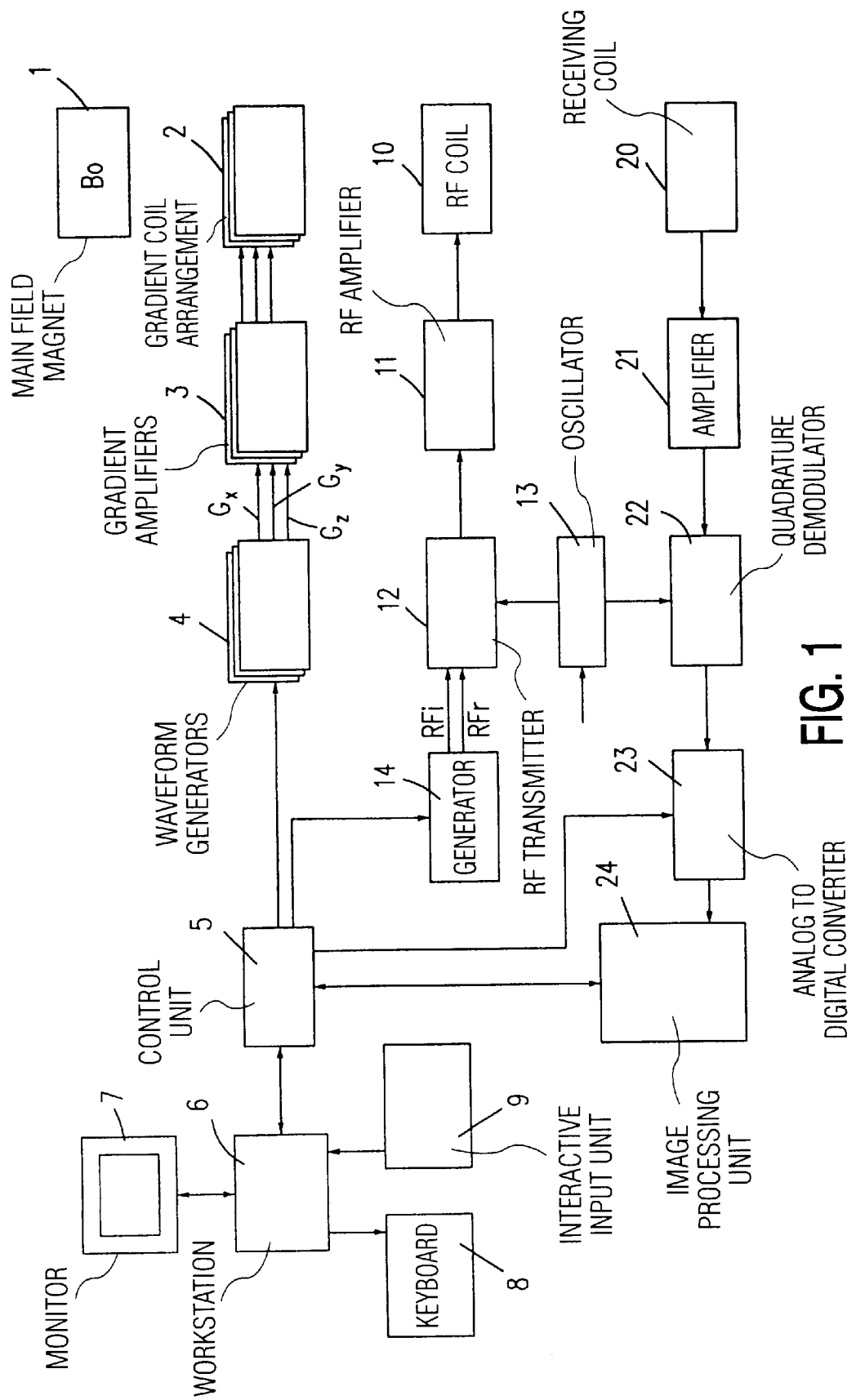
FIG. 1 shows an MR system which is suitable for carrying out the invention.

The reference numeral 1 in FIG. 1 denotes a diagrammatically represented main field magnet which generates a steady, essentially uniform magnetic field which has a strength of, for example 1.5 tesla and extends in a z direction in an examination zone which is not shown. The z direction extends in the longitudinal direction of an examination table (not shown) on which a patient is arranged during an examination.

There is also provided a gradient coil arrangement 2 which includes three coil systems which are capable of generating gradient fields $G_x$, $G_y$ and $G_z$ which extend in the z direction and have a gradient in the x direction, the y direction and the z direction, respectively. The currents for the gradient coil arrangement 2 are supplied by a respective gradient amplifier 3. The temporal variation thereof is predetermined by a waveform generator 4, that is to say separately for each direction. The waveform generator 4 is controlled by an arithmetic and control unit 5 which calculates the temporal variation of the magnetic gradient fields $G_x$, $G_y$, and $G_z$ as required for a given examination method and loads it into the waveform generator 4. During the MR examination, these signals are read from the waveform generator 4 and applied to the gradient amplifier arrangement 3 which generates the currents therefrom which are required for the gradient coil arrangement 2.

The control unit 5 also co-operates with a workstation 6 which includes a monitor 7 for the display of MR images. Entries can be made via a keyboard 8 or an interactive input unit 9.

The nuclear magnetization in the examination zone can be excited by RF pulses from an RF coil 10 which is connected to an RF amplifier 11 which amplifies the output signals of an RF transmitter 12. In the RF transmitter 12 the (complex) envelopes of the RF pulse modulated with the carrier oscillations which are supplied by an oscillator 13 and whose frequency corresponds to the Larmor frequency (approximately 63 MHz in the case of a main magnetic field of 1.5 tesla). The arithmetic and control unit loads the complex envelope into a generator 14 which is coupled to the transmitter 12.

The MR signals generated in the examination zone are picked up by a receiving coil 20 and amplified by an amplifier 21. The amplified MR signal is demodulated by two 90° offset carrier oscillations of the oscillator 13 in a quadrature demodulator 22, so that two signals are generated which may be considered as the real component and the imaginary component of a complex MR signal. These signals are applied to an analog-to-digital converter 23 which forms MR data therefrom. On the basis of the MR data derived from an MR signal, a respective one-dimensional projection image (view) is formed by Fourier transformation in an image processing unit 24. After application of a noise reduction filter to these projection images, two-dimensional MR images are reconstructed therefrom in the image processing unit 24. These images are displayed on the monitor 7 after having been subjected to a noise reduction filter.

Figure 2:
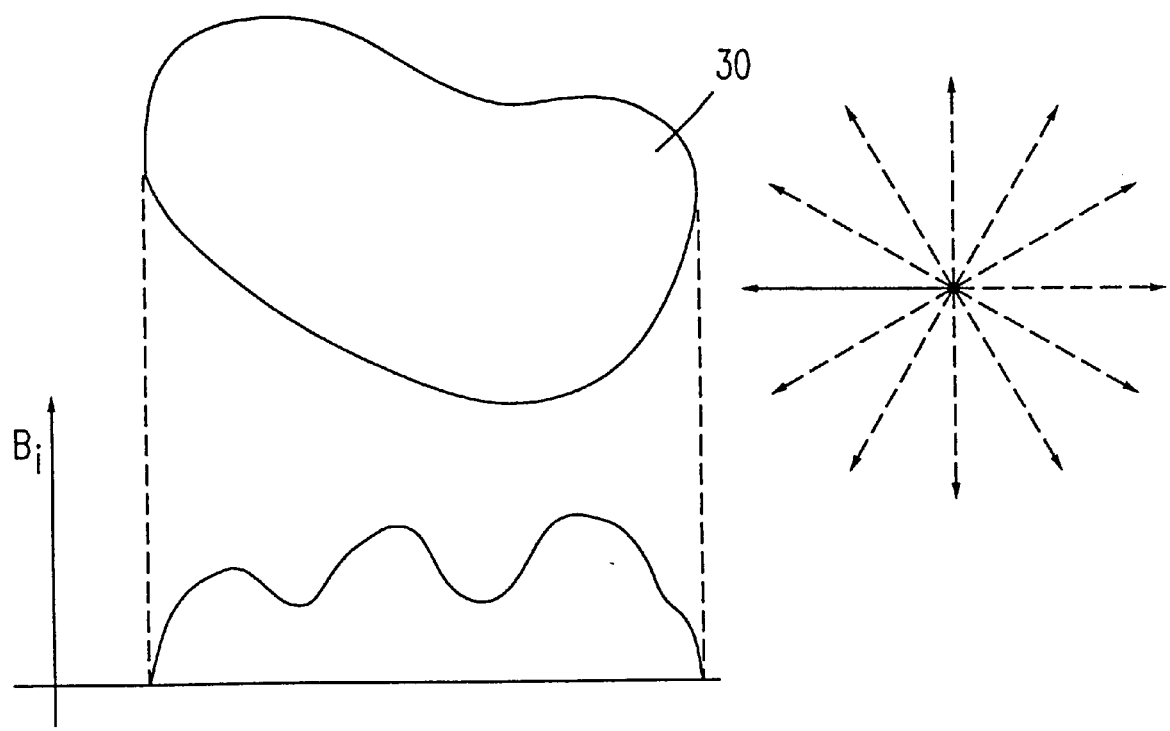
FIG. 2 illustrates the formation of a one-dimensional projection image.

FIG. 2 shows the brightness variation in a one-dimensional projection image $B_i$ of a two-dimensional object 30 to be examined. Such a projection image is obtained if, after the excitation of the nuclear magnetization in a slice of the examination zone 30, the MR signal is read out, without phase encoding, by means of a read gradient extending in the direction of the solid arrow, and the MR signal is subsequently subjected to a Fourier transformation. A two-dimensional image of the nuclear magnetization distribution in the slice of the object 30 to be examined can be reconstructed from a number of such one-dimensional projections with different gradient directions (denoted by dashed arrows in FIG. 2). When these sequences are cyclically repeated, a number of sets of one-dimensional images is obtained, from each of which a respective two-dimensional image can be reconstructed.

Figure 3:
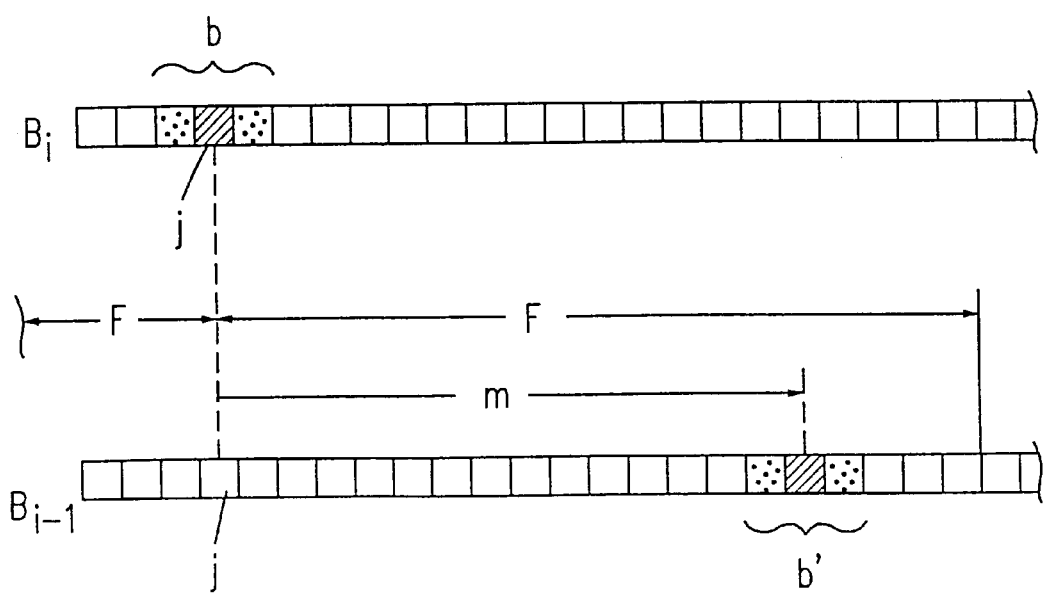
FIG. 3 shows two successive projection images.

FIG. 3 shows parts of two of such one-dimensional projection images $B_i$ and $B_{i-1}$, it being assumed that these images have been formed with the same and with the opposite gradient direction, respectively (i.e. with a difference of 360° or 180° between the gradient directions). They thus represent a projection of the object at different instants, but with the same and the opposite gradient direction, (in other words, with parallel gradient directions) respectively. Each image consists of a set of pixels which are symbolically represented by boxes in FIG. 3, for example 128 or 256 pixels; with each pixel there is associated an image value which corresponds to the line integral of the nuclear magnetization in the direction perpendicular to the relevant gradient direction.

If the two projection images $B_i$ and $B_{i-1}$ were identical, all vectors of the motion vector would be zero. However, because the images usually differ in at least some regions, motion vectors m which deviate from zero occur in those regions. Each of these vectors indicates how much, and in what direction, the pixels reproducing one and the same point or region of the object to be examined in the two images have been shifted relative to one another. This results in an allocation of addresses at which the image values of the two content-wise associated pixels are stored in the two images.

The projection image $B_i$ shows a block b which consists of three (or more) associated pixels and is centered around the pixel j. The block b' in the preceding projection image $B_{i-1}$, reproducing the same structures in the object 30 to be examined, may have been shifted due to object motions between the acquisition of the MR signals associated with the images $B_i$ and $B_{i-1}$, i.e. it may be situated at the distance m from the pixel j in the projection image $B_{i-1}$. Thus, it is essential to determine automatically for the pixel j in the image $B_i$ the motion vector m which links the content-wise associated pixels in the successive projection images $B_i$ and $B_{i-1}$. The image values of these pixels are subjected to a filtering operation.

Figure 4:
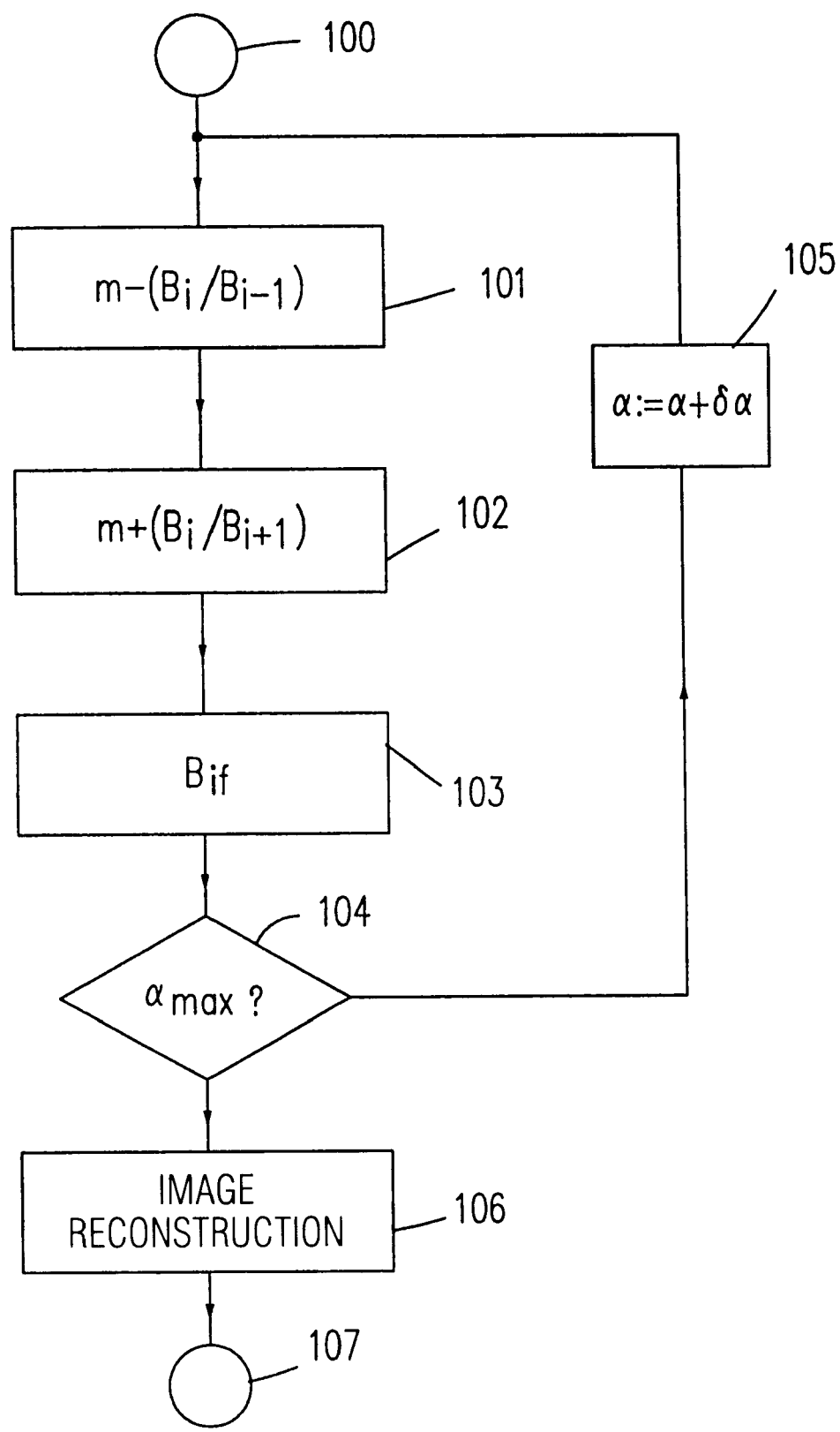
FIG. 4 shows a flow chart illustrating the method according to the invention.

The execution of the processing steps in the image processing unit 24, in as far as the noise reduction is concerned, will be described in detail hereinafter with reference to FIG. 4. After the initialization (step 100), two, three or more projection images are available in the image processing unit 24; these images represent a projection of the object 30 at the same projection angle or a 180° shifted projection angle (in other words, having parallel projection directions) and have been formed at successive instants. They thus reproduce the object to be examined in different (one-dimensional) phases of motion. The successive projection images thus deviate from one another, be it only slightly in many cases.

In the step 101 there is determined the motion vector field m- which describes the difference between a projection image $B_i$ and the preceding projection image $B_{i-1}$. having the same projection direction. The individual steps for determining the motion vectors will be described in detail hereinafter on the basis of the flow chart shown in FIG. 5.

In the step 201 a given block b in the projection image $B_i$ is selected, for example the block centered around the pixel j. In the step 202 a block b' is determined in the preceding projection image $B_{i-1}$, which block b' is situated within a window F (see FIG. 3) around the pixel j. The window should on the one hand be large enough to handle even the largest shifts between the two images and on the other hand as small as possible so as to minimize the arithmetical requirements.

In the step 203 the correspondence of the predetermined blocks b and b' is evaluated by means of an appropriate similarity measure M. In the simplest case there is formed the absolute value or the square of the difference between image values of those pixels which have the same position within their blocks, the values resulting for all pixels within the blocks being summed. When this sum has a minimum value, the correspondence between the block b' and the block b is best. However, it has been found that this minimum is not very pronounced in the case of MR images, so that the position of the block b' showing the best correspondence cannot be determined exactly. Better results are obtained when the correlation of the image values in the corresponding pixels of the blocks b and b' is determined.

In the step 204 it is checked whether the correspondence between the block b' and the selected block b in the image $B_i$ is optimum. If this is not the case, the position of the image section b' in the window F is varied in the step 205, and the similarity measure is calculated again (203) and it is checked whether the optimum has been reached (204). When the optimum has been reached, the motion vector m is derived from the associated position of the block b'.

After detection of the optimum correspondence between b and b' in the step 204, it is checked in the step 207 whether all motion vectors required for the image $B_i$ have been determined. If this is not the case, a block b having a different center is selected in the step 206 and the procedure is repeated until the associated motion vector has been determined for all pixels of the image $B_i$ (or at least for pixels situated at given distances from one another); this part of the method has then been completed.

In the loop 202 . . . 206 it would in principle be possible to calculate a similarity measure for all feasible positions of the block b' in the window F, to store the similarity measures for all block positions, and to select the block position for which the blocks show the best correspondence. However, a substantial amount of arithmetic work would then be required. More attractive are methods which derive, from the preceding position of the block b' and the similarity measures m determined for this position in the step 203, the position which could offer better correspondence when the loop 202 . . . 205 is subsequently executed again. The optimum position of the block b' can thus be iteratively determined while using fewer executions of the loop 202 . . . 205 than in the case of evaluation of every feasible position of the block b' within the search window F, followed by selection of the position offering the best correspondence possible.

Figure 6:
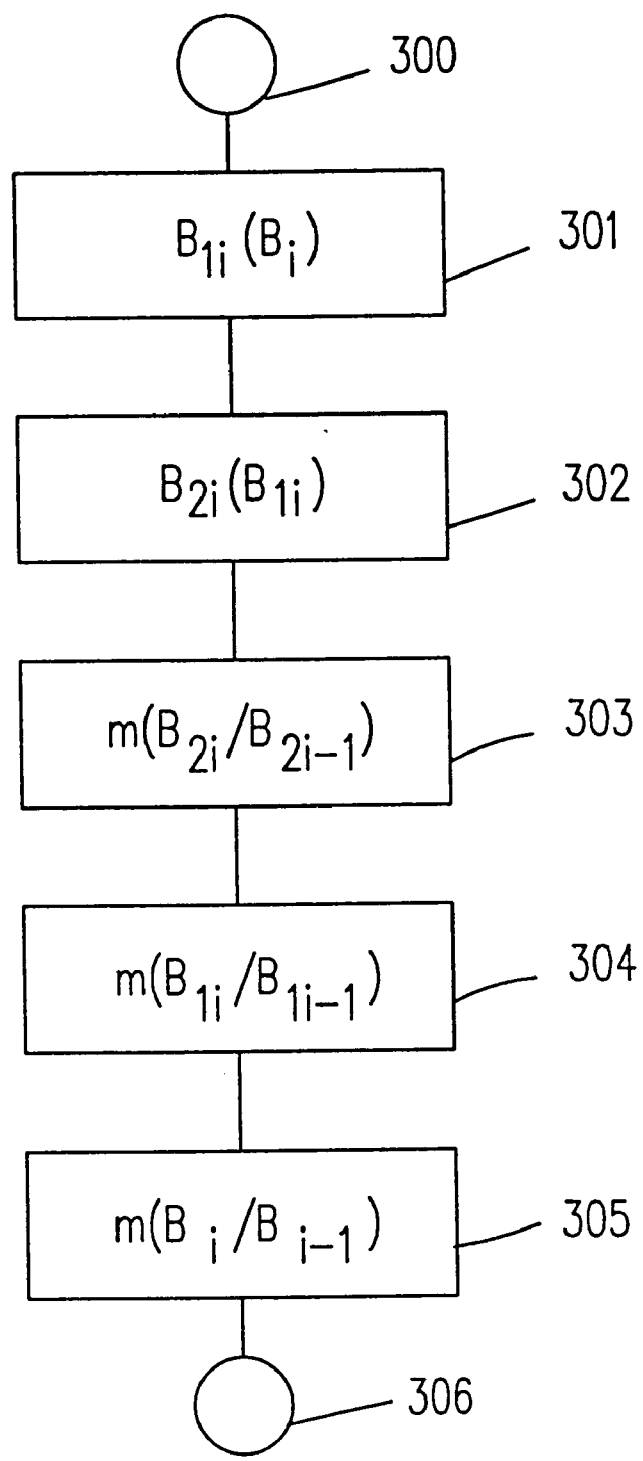
FIG. 6 shows a flow chart illustrating a modified version of the method.

FIG. 6 illustrates a search strategy whereby a motion vector can be particularly quickly determined. In the step 301 first an image $B_{1i}$ is derived from the image $B_i$; this derived image comprises only half the number of pixels of the image thus far and hence has a correspondingly reduced spatial resolution. Thus, from the image $B_i$, having, for example 256 pixels, there is formed an image $B_{1i}$ having only 128 pixels. The image values of this low-resolution image $B_{1i}$ are formed by forming the arithmetical mean of the image values associated with a respective group of two pixels in the image $B_i$.

It is assumed that a correspondingly decimated image $B_{1i-1}$ which has been derived from the preceding projection image $B_{i-1}$ is already available in the step 301. If this is not the case, this operation must also be performed in the step 301.

From the already decimated image $B_{1i}$ in the step 302 there is derived a further decimated image $B_{2i}$ which comprises only 64 pixels in the present example, its spatial resolution being only half that of the image $B_{1i}$. If necessary, further decimation steps may also be performed.

Figure 5:
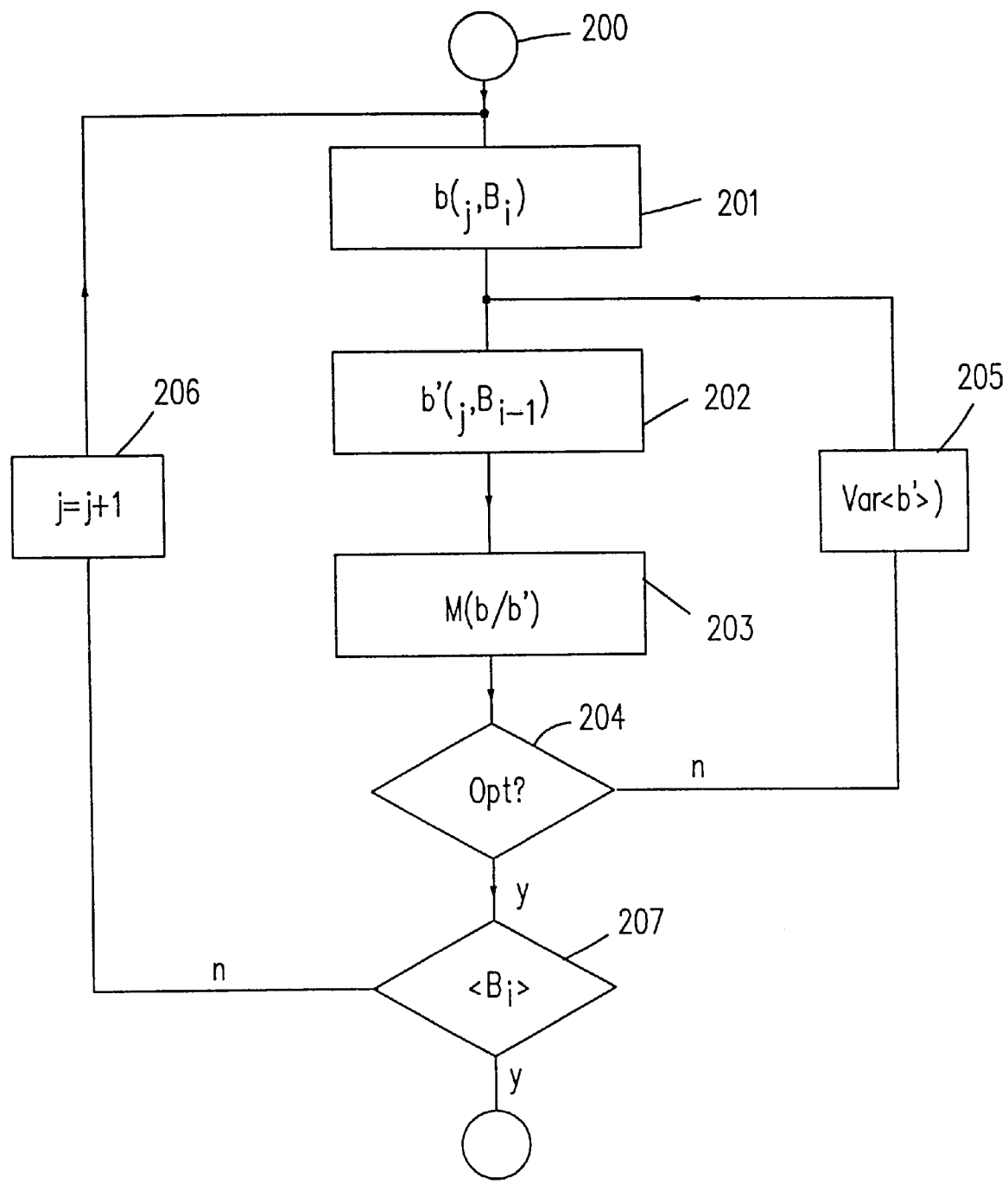
FIG. 5 shows a flow chart illustrating the determination of a motion vector field.

In the step 303 a motion vector field is determined for the images $B_{2i}$ and $B_{2i-1}$ which have been decimated twice, the blocks in the decimated images comprising exactly as many pixels as for the search strategy in the original image described with reference to FIG. 5. However, the search window can be reduced because a pixel in the image $B_{2i}$, which has been decimated twice, covers four pixels in the original image $B_i$. Therefore, a motion vector field is comparatively quickly determined on the basis of this comparatively coarse resolution. The motion vectors reproduce the actual motion or shift only comparatively inaccurately, but a very robust estimate of the shift or the motion which is insusceptible to noise and other image artefacts is thus obtained. This motion vector field is determined in principle in the same way as described with reference to FIG. 5.

On the basis of the (coarsely) determined motion vectors, in the step 304 the method is repeated at the next higher resolution level, i.e. with the projection images $B_{1i}$ and $B_{1i-1}$, the search zone (measured in number of pixels) remaining equally large (so that the geometrical dimensions of the search zone are only half as large).

The motion vectors determined during this search in the step 304 then form the starting vectors in the step 305 for the search in the image with the next higher resolution, being the image $B_{i-1}$ in the present example.

This hierarchical search strategy yields a comparatively accurate determination of the motion vectors which is substantially insusceptible to artefacts and noise and requires a comparatively small amount of arithmetic work. The method of determining the motion vector field has thus been completed (step 306).

Referring to FIG. 4 again, in the step 102 a motion vector field m+ is determined again, which field indicates to what extent and in which direction the pixels in the next projection image $B_{i+1}$, having the same projection direction as the image $B_i$, have been shifted with respect to the content-wise associated pixels in the image $B_i$. The determination of this motion vector can be performed in the same way as described before with reference to the FIGS. 5 and 6. After this step, the position of the corresponding pixels (or the pixels content-wise associated therewith) in the images $B_{i-1}$ and $B_{i+1}$ is known for all pixels in the image $B_i$.

In the steps 101 and 102 the motion vectors were determined for the three successive projection images $B_{i-1}$, $B_i$ and $B_{i+1}$. However, it is also possible to subject only two projection images to the noise filtering operation (for example, the images $B_i$ and $B_{i-1}$) or more than three images. In the steps 101 and 102 a respective motion vector field was calculated for each time two successive images. However, the motion vector fields can also be determined simultaneously for corresponding blocks in the three (or more) images by utilizing higher-order statistics, for example the triple correlation. Instead of the steps 101 and 102, only one step would then be required for determining the motion vector field.

In the step 103 a noise filtering operation can then be performed while utilizing the image values of content-wise associated or corresponding pixels. There are various possibilities for determining a filtered image value $B_{if}$ for the central pixel in the block b in the image $B_i$:

a) The filtered image value for this pixel is calculated as the arithmetical mean of the image values of the central pixel in the images $B_{i-1}$, $B_i$ and $B_{i+1}$. The signal-to-noise ratio would then be improved by approximately 1.7.

b) The filtered image value is calculated as the arithmetical mean value of the central pixel and its neighboring pixels, so overall from the image values of nine pixels. The signal-to-noise ratio could then be improved by a factor 3, be it at the expense of the image sharpness.

c) The image values of said pixels are summed in a weighted fashion, the relative weight assigned to an image value being greater as the difference between this image value and the image value for the central pixel in the image $B_i$ is smaller. A maximum value can then be defined for the relative weight in order to ensure that the weight of differences below a lower limit value, which may also be caused by noise, is not too great. The signal-to-noise ratio that can thus be achieved generally is less than a factor 3, but an edge-preserving filtering operation is now performed because large differences, as they could occur at the image edges, are assigned a low weight only. The fine structures in the image, therefore, are preserved in as far as they are distinct from the noise.

If not all projection directions have been processed, as checked in the step 104, the method is repeated for projection images having a different projection direction (step 105) until a noise-reduced projection image is available for all projection directions covered in a measuring cycle required for a two-dimensional MR image. A two-dimensional MR image can be reconstructed (step 106) from these filtered projection images $B_{if}$ in known manner. This MR image reveals the anatomic structures exactly as an MR image reconstructed directly from the projection images for the different projection directions, but it has a clearly improved signal-to-noise ratio. The method has thus been completed for the projection images associated with the same measuring cycle (step 107). The same operation must then be performed for projection images belonging to the next measuring cycle (for the next two-dimensional MR image).

Figure 7:
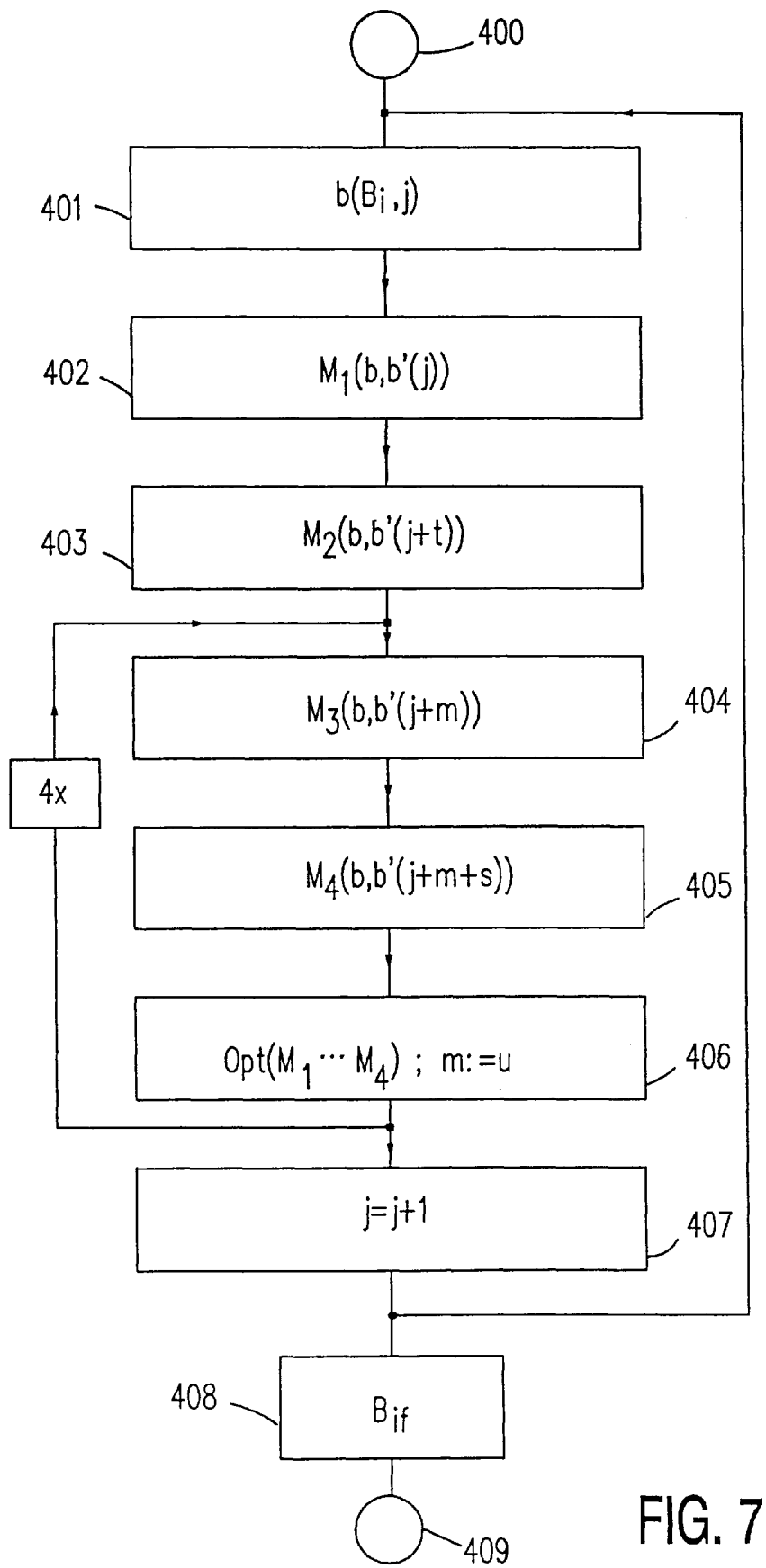
FIG. 7 shows a flow chart illustrating a preferred method of determining the motion vector field.

A particularly fast version for the reduction of noise in a single projection image will be described in detail hereinafter with reference to FIG. 7.

After the initialization (400), a block b is selected in the image $B_i$ in the step 401, said block being centered relative to the pixel j. This block may comprise, for example only three pixels. Subsequently, the block b' in the preceding image $B_{i-1}$ which shows the best correspondence with the block b must be determined. The motion vector m (FIG. 2) results from the shift of the two blocks within the two images. The motion vector m is determined as follows.

In the step 402 the similarity measure M1 is determined between the block b and a block b'(j) which has the same position in the image $B_{i-1}$ as the block b in the image $B_i$, i.e. which is centered around the pixel j in this image (corresponding to a motion vector zero). The similarity measure $M_1$ can be calculated, for example by calculating the absolute value of the difference between the image values of the corresponding pixels in the blocks b and b'(j). Subsequently, the similarity measure $M_2$ between the block b and a block b'(j+t) in the image $B_i$ is calculated in the same way, the latter block having been shifted with respect to the block b by the motion vector t which was determined for the pixel j in the image $B_{i-1}$ (by comparison with the preceding image $B_{i-2}$).

In a further step (404) a third similarity measure $M_3$ is calculated between the image section b and an image section b'(j+m) which has been shifted by the motion vector m in the image $B_{i-1}$. When the step 401 for the pixel j is executed for the first time, m =0.

Finally, in a further step (405) the similarity measure $M_4$ is determined for the block b and a block b'(j+m+s) which has been shifted by the motion vector m+s in the image $B_{i-1}$. with respect to the pixel j. Therein, s is a random number which may lie, for example between +4 and −4 (pixel distances).

In the step 406 it is determined which of the three similarity measures represents the best correspondence. The motion vector associated with this similarity measure, denoted by the reference u, is determined. Furthermore, the new motion vector m is equalized to the motion vector u found.

Subsequently, the loop formed by the steps 404 . . . 406 is executed several times, for example four or five times, during which the values $M_3$ and $M_4$ may vary. After the last execution, the motion vector m for which the best correspondence exists between the blocks b and b' will have been determined.

During the subsequent step 407, the pixel (j+1) neighboring the pixel j is selected. For this pixel the steps 401 to 406 are repeated, after which this operation is performed for the next pixel but one and so on until ultimately a motion vector has been found for all pixels of the image $B_i$.

The filtering operation can then be performed in the step 408 by forming, for the pixel j in the image $B_i$, a filtered value from the weighted sum of the image values of the pixel j and its two neighboring pixels as well as the content-wise associated pixels, via the motion vector m, of the block b' in the image $B_{i-1}$. The relative weight wi attached to the image values of the block b entering this summing operation is then calculated in conformity with the equation $$w_i = \frac{c}{\alpha d + 1} \quad (1)$$

Therein, d is the absolute value of the difference between the image value of the relevant pixel and the image value of the pixel j. $\alpha$ is a factor predetermining to what extent edges are preserved in the image. For $\alpha=0$, the edges become unsharp; the edges are preserved better as the value of ca increases, be it that the signal-to-noise ratio is then improved less at the edge. A suitable value for $\alpha$ is, for example $\alpha=1.5$. c is a scaling constant.

The weighting factors $w_{i-1}$ applied to the image values of the pixels of the block b' entering the weighted summing of the filtered value for the pixel j in the block b follow from the equation $$w_{i-1} = w_i \frac{c}{\alpha d + 1} \quad (2)$$

Therein, d again represents the absolute value of the difference between the image value of the relevant pixel and the image value of the pixel j in the image $B_i$, and wi is the weighting factor of the pixel in the block b which has the same position in the block as the relevant pixel in the block b'. The weighting factor wi for the pixel j in the block b amounts to c. c is chosen so that the sum of the six weighting factors thus calculated is 1.

During this calculation of a filtered output image for the image $B_i$, the MR signals for the next projection image can already be acquired, the read gradient then having a direction which deviates (see the arrows in FIG. 2) from that of the read gradient for the image $B_i$. Therefore, the filtering does not become apparent in the temporal execution of the method. Two-dimensional images (having an improved signal-to-noise ratio) can then be reconstructed, using the customary reconstruction algorithms, from the filtered one-dimensional output images.

It has been assumed in the foregoing that the projection images reproduce an object in different phases of motion. However, projection images which reproduce a stationary object in different, mutually parallel slices, for example along the longitudinal axis of the body, from the same projection direction may also be concerned. The basic assumption is that a comparison takes place of such (one-dimensional) images which reproduce the object to be examined with the same (or the opposite) projection direction; this means that these images would be identical if the object to be examined would not move and if no noise were superposed on the MR signals (the above motion estimation for determining the motion vector field is also based on the validity of this assumption). The assumption that neighboring images reproduce the same structures, be it possibly in a different position, is again satisfied to a high degree.

In the foregoing the motion vectors were derived from the image values, i.e. from the amplitude of the nuclear magnetization in the relevant pixel. However, because the device shown in FIG. 1 is also capable of acquiring the phase of the nuclear magnetization distribution for each pixel at the same time and because this phase can be strongly influenced by object motions, this phase can be used (additionally) for determining the motion vector fields.

The image processing method according to the invention has been described in conjunction with a series of MR images. However, a series of X-ray CT images can also be used. However, in that case the projection images usually are not based on a parallel projection, as in FIG. 1, but on a central projection in conformity with the geometry of the X-ray beam. Filtered output images are then calculated from these projection images in the same way as described with reference to the FIGS. 3 to 7, after which a two-dimensional X-ray CT image is reconstructed therefrom. All references cited herein, as well as the priority documents German Patent Application 19710339.1 filed Mar. 13, 1997 and German Patent Application 19713846.2 filed Apr. 4, 1997, are incorporated herein by reference in their entirety and for all purposes to the same extent as if each individual publication or patent or patent application was specifically and individually indicated to be incorporated by reference in its entirety for all purposes.

What is claimed is:

1. A diagnostic image processing method for reconstructing a two-dimensional (2D) image of an object present in an examination zone from a plurality of one-dimensional (1D) projection images and which comprises pixels, the method comprising:

forming a plurality of 1D projection images by projection of the object from a plurality of predetermined projection directions, determining a plurality of motion vector fields, each motion vector field linking content-wise associated pixels in at least two 1D projection images with parallel projection directions, applying a noise reduction filter to the image values of the content-wise associated pixels linked by each motion vector field in at least two 1D projection images with parallel projection directions, using the image values resulting from the filtering operation to form a plurality of filtered output 1D projection images, and reconstructing a 2D image from the plurality of filtered output 1D projection images.

2. An image processing method as claimed in claim 1, wherein determining a motion vector field linking at least two 1D projection images with parallel projection directions further comprises:

selecting a first block of pixels in a first 1D projection image, determining the position of a corresponding second block which is present in at least one of the other 1D projection images having the best correspondence with the selected block in the first 1D projection image, deriving a motion vector from the position of the selected first block and the position of the corresponding second block, and repeating the previous steps in order to derive a plurality of motion vectors which form the motion vector field.

3. An image processing method as claimed in claim 2, wherein the step of determining the position of the corresponding second block further comprises:
- applying a similarity measure in order to evaluate the correspondence of the first block in the first 1D projection image with the second block which is present in different positions in the other 1D projection image, and
- determining the position for which the optimum similarity measure is obtained.

4. An image processing method as claimed in claim 3, wherein determining the position for which the optimum similarity measure is obtained further comprises:
- determining the similarity measure for a starting position of the second block,
- changing the position of the second block and determining the similarity measure for the changed position,
- deriving a new position of the second block from the similarity measures for the present position and for the preceding positions,
- determining the similarity measure for the new position of the second block, and
- iterative repetition of the prior two steps.

5. An image processing method as claimed in claim 1 wherein determining a motion vector field further comprises:
- forming at least one plurality of second 1D projection images having a reduced spatial resolution and a reduced number of pixels, one second 1D projection image being formed from each original 1D projection image,
- determining motion vectors which link content-wise associated pixels in different second 1D projection images which are formed from original 1D projection images with parallel projection directions, and
- repeating the prior step for 1D projection images with the next higher spatial resolution, where the newly determined motion vectors are based on previously determined motion vectors at a lower resolution.

6. An image processing method as claimed in claim 1, wherein the step of applying a noise reduction filter at a given pixel in a given 1D projection image further comprises performing a weighted summing of the image value of a pixel which is content-wise associated with the given pixel in another 1D projection image and also of the image values of pixels which are neighbors of the content-wise associated pixel, the weighting factors for a pixel being greater as the difference between the images value of the pixel and the image value of the content-wise associated pixel is smaller.

7. An image processing method as claimed in claim 1, wherein determining a motion vector field further comprises determining a motion vector for a pixel of a first 1D projection image with respect to a second 1D projection image with parallel projections direction by a plurality of cycles, each cycle comprising:
- selecting different motion vectors at the given pixel, at least one of which can be varied from one cycle to another,
- evaluating, using a similarity measure, a given block about the given pixel with the given block shifted by each motion vector, and
- selecting the motion vector having the most attractive similarity measure.

8. The method of claim 1 wherein the step of applying a noise reduction filter further comprises applying the noise reduction filter both to the image values of the content-wise associated pixels linked by each motion vector field and to one of more of their neighboring pixels in at least two 1D projection images with parallel projection directions.

9. A device for carrying out an image processing method, comprising:
- means for forming a plurality of one-dimensional (1D) projection images of an object present in an examination zone by projection of the object from one of a plurality of predetermined projection directions each 1D projection image comprising pixels, and
- a programmable image processing unit for processing the 1D projection images, wherein the image processing unit is programmed to perform the following steps
- determining a plurality of motion vector fields, each motion vector field linking content-wise associated pixels in at least two 1D projection images with parallel projection directions,
- applying a noise reduction filter to the image values of the content-wise associated pixels linked by each motion vector field in two or more 1D projection images with parallel projection directions,
- using the image values resulting from the filtering operation to form a plurality of filtered output 1D projection images, and
- reconstructing a 2D image from the plurality of filtered output 1D projection images.

10. The device of claim 9 wherein the programmable image processor is programmed to further perform applying a noise reduction filter both to the image values of the content-wise associated pixels linked by each motion vector field and to at least one of more of their neighboring pixels in two or more 1D projection images with parallel projection directions.

* * * * *